US012628148B2

(12) United States Patent
Li

(10) Patent No.: US 12,628,148 B2
(45) Date of Patent: May 12, 2026

(54) BEAM INDICATION METHOD AND APPARATUS

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 359 days.

(21) Appl. No.: 18/278,489

(22) PCT Filed: Feb. 25, 2021

(86) PCT No.: PCT/CN2021/077963
§ 371 (c)(1),
(2) Date: Aug. 23, 2023

(87) PCT Pub. No.: WO2022/178779
PCT Pub. Date: Sep. 1, 2022

(65) Prior Publication Data
US 2024/0137924 A1 Apr. 25, 2024
US 2024/0236968 A9 Jul. 11, 2024

(51) Int. Cl.
*H04W 72/044* (2023.01)
*H04L 5/00* (2006.01)
*H04W 72/232* (2023.01)

(52) U.S. Cl.
CPC ......... *H04W 72/046* (2013.01); *H04L 5/0053* (2013.01); *H04W 72/232* (2023.01)

(58) Field of Classification Search
CPC ... H04L 5/0094; H04L 5/0053; H04L 5/0023; H04L 5/0048; H04W 72/046; H04W 72/232
See application file for complete search history.

(56) References Cited

U.S. PATENT DOCUMENTS

| | | | |
|---|---|---|---|
| 2020/0059290 A1* | 2/2020 | Pan | H04B 7/06952 |
| 2020/0163074 A1 | 5/2020 | Tang et al. | |
| 2020/0228190 A1 | 7/2020 | Cirik et al. | |
| 2020/0413469 A1 | 12/2020 | Wu et al. | |
| 2021/0266947 A1 | 8/2021 | Yang et al. | |
| 2022/0132550 A1* | 4/2022 | Yu | H04L 1/1854 |
| 2022/0225299 A1* | 7/2022 | Pezeshki | H04L 5/0053 |

(Continued)

FOREIGN PATENT DOCUMENTS

| | | |
|---|---|---|
| CN | 109089322 A | 12/2018 |
| CN | 109302720 A | 2/2019 |

(Continued)

OTHER PUBLICATIONS

VIVO. "R1-2007644 Further discussion on multi beam enhancement", 3GPP TSG RAN WG1#103-e R1-2007644, Nov. 13, 2020.

(Continued)

*Primary Examiner* — Andrew Lee
(74) *Attorney, Agent, or Firm* — Volpe Koenig

(57) ABSTRACT

A beam indication method includes: receiving first control signaling, where the first control signaling is configured to determine a target common beam, and the target common beam is configured to transmit a member in a first target common beam group; and transmitting at least one member in the first target common beam group by the target common beam.

20 Claims, 4 Drawing Sheets

S101

Receive first control signaling, where the first control signaling is configured to determine a target common beam, and the target common beam is configured to transmit a member in a first target common beam group

S102

Transmit at least one member by the target common beam

(56)                        References Cited

U.S. PATENT DOCUMENTS

2023/0085875 A1      3/2023  Li
2023/0291525 A1*     9/2023  Zhou ...................... H04B 7/088
2023/0361827 A1*    11/2023  Fan ...................... H04B 7/0617
2024/0015718 A1*     1/2024  Cao ..................... H04W 72/046
2024/0064649 A1*     2/2024  Go ...................... H04W 52/262

FOREIGN PATENT DOCUMENTS

CN          111106915  A     5/2020
CN          111279778  A     6/2020
CN          111435855  A     7/2020

OTHER PUBLICATIONS

VIVO. "R1-1715619_Discussion on beam measurement, beam report-
ing and beam indication", 3GPP TSG RAN WG1 NR Ad Hoc #3
R1-1715619, Sep. 21, 2017.
MediaTek Inc. "R1-2005619_Enhancement on multi-beam opera-
tion", 3GPP TSG RAN WG1 #102-e R1-2005619, Aug. 28, 2020.

* cited by examiner

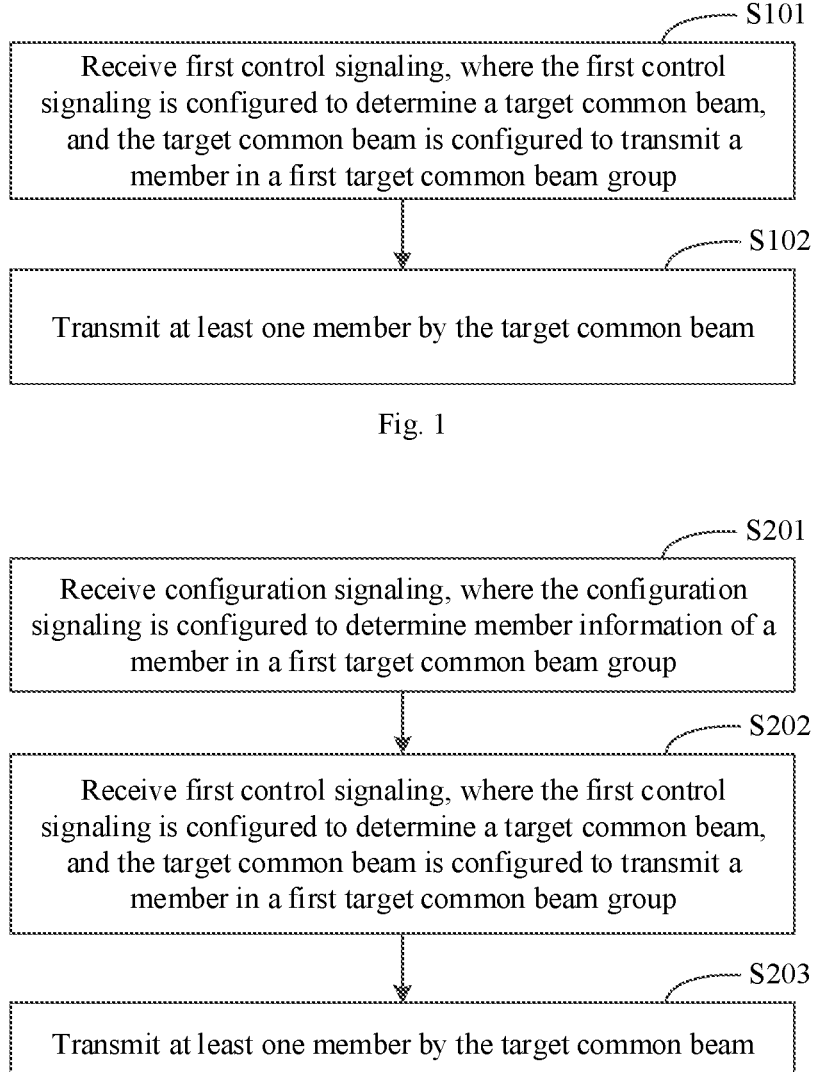

S101

Receive first control signaling, where the first control signaling is configured to determine a target common beam, and the target common beam is configured to transmit a member in a first target common beam group

S102

Transmit at least one member by the target common beam

Receive configuration signaling, where the configuration signaling is configured to determine member information of a member in a first target common beam group

S202

Receive first control signaling, where the first control signaling is configured to determine a target common beam, and the target common beam is configured to transmit a member in a first target common beam group

S203

Transmit at least one member by the target common beam

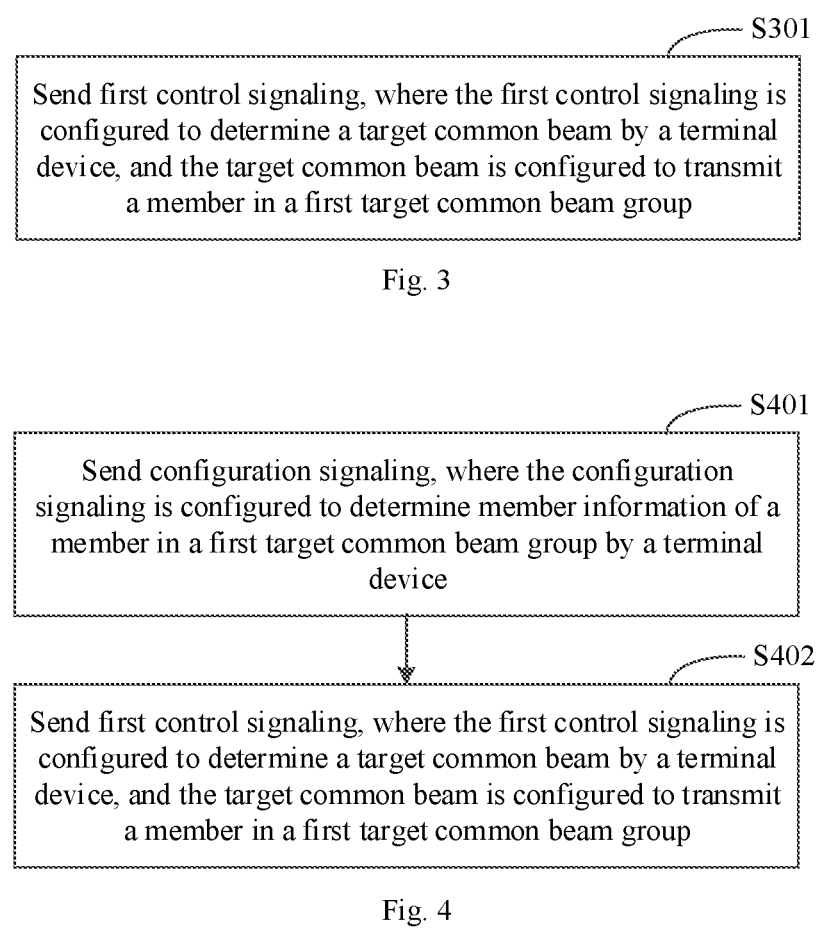

Send first control signaling, where the first control signaling is configured to determine a target common beam by a terminal device, and the target common beam is configured to transmit a member in a first target common beam group

Send configuration signaling, where the configuration signaling is configured to determine member information of a member in a first target common beam group by a terminal device

S402

Send first control signaling, where the first control signaling is configured to determine a target common beam by a terminal device, and the target common beam is configured to transmit a member in a first target common beam group

Fig. 4

BEAM INDICATION METHOD AND APPARATUS

CROSS REFERENCE TO RELATED APPLICATION

The present application is a U.S. National Stage of International Application No. PCT/CN2021/077963, filed on Feb. 25, 2021, the contents of all of which are incorporated herein by reference in their entirety for all purposes.

BACKGROUND

With the development of new radio (NR) technologies, attenuation of a high-frequency channel is fast, and to ensure a network coverage, it needs to use beam-based transmission.

SUMMARY

The present disclosure provides a beam indication method and apparatus.

An example of a first aspect of the disclosure provides a beam indication method, performed by a terminal device, and including: receiving first control signaling, where the first control signaling is configured to determine a target common beam, and the target common beam is configured to transmit a member in a first target common beam group; and transmitting at least one member in the first target common beam group by the target common beam.

An example of a second aspect of the disclosure provides another beam indication method, performed by a network side device, and including: sending first control signaling, where the first control signaling is configured to determine a target common beam by a terminal device, and the target common beam is configured to transmit a member in a first target common beam group.

An example of a third aspect of the disclosure provides a communication device, including: at least one processor; and a memory in communication connection with the at least one processor, where the memory stores instructions capable of being executed by the at least one processor, and the instructions, when executed by the at least one processor, enable the at least one processor to execute the beam indication method described in the example of the first aspect of the disclosure, or the beam indication method described in the example of the second aspect of the disclosure.

Part of the additional aspects and advantages of the disclosure will be given in the following description, and part of them will become apparent in the following description or known by practice from the disclosure.

BRIEF DESCRIPTION OF THE DRAWINGS

The above-mentioned and/or additional aspects and advantages of the disclosure will become apparent and understandable in the description, for example, in conjunction with the following accompanying drawings, in which:

FIG. 1 is a schematic flow chart of a beam indication method provided by an example of the disclosure.

FIG. 2 is a schematic flow chart of another beam indication method provided by an example of the disclosure.

FIG. 3 is a schematic flow chart of another beam indication method provided by an example of the disclosure.

FIG. 4 is a schematic flow chart of another beam indication method provided by an example of the disclosure.

DETAILED DESCRIPTION

Figure 5:
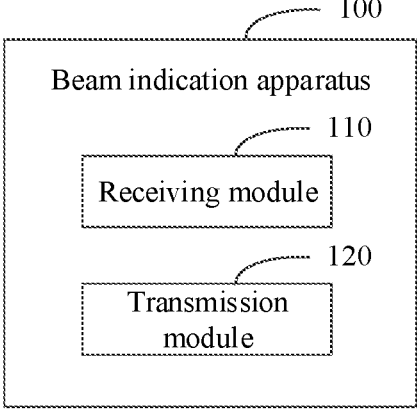
FIG. 5 is a schematic structural diagram of a beam indication apparatus provided by an example of the disclosure.

The examples of the disclosure will be described in detail below, and instances of the examples are shown in the accompanying drawings, where the same or similar numerals throughout indicate the same or similar elements or elements with the same or similar functions. The examples described below with reference to the accompanying drawings are examples to explain the disclosure, rather than to be understood as limitations.

The specific description of terminal devices involved in the examples of the disclosure is as follows: the terminal devices may be scattered throughout a whole mobile communication system, and each terminal device may be stationary or mobile. The terminal device may further be referred to by those skilled in the art as a mobile station, a user station, a mobile unit, a user unit, a wireless unit, a remote unit, a mobile device, a terminal device, a wireless device, a wireless communication device, a remote device, a mobile user station, an access terminal device, a mobile terminal device, a wireless terminal device, a remote terminal device, a handheld device, a user agent, a mobile client, a client, or some other appropriate terms. The terminal device may be a cellular phone, a personal digital assistant (PDA), a wireless modem, a wireless communication device, a handheld device, a tablet, a laptop, a cordless telephone, a wireless local loop (WLL) station, a wearable device, a vehicle-mounted terminal, and the like, and can communicate with a base station in the mobile communication system.

The specific description of a network side device involved in the examples of the disclosure is as follows: the network side device is deployed in a wireless access network to provide a wireless access function for the terminal device. The network side device may be a base station (BS). The network side device may be in wireless communication with the terminal device via one or more antennas. The network side device may provide a communication coverage for a geographical area where it is located. The base station may include different types, such as a macro base station, a micro base station, a relay station, and an access point. In some examples, the base station may be referred to by those skilled in the art as a base station transceiver, a wireless base station, an access point, a wireless transceiver, a basic service set (BSS), an extended service set (ESS), a NodeB, an evolved NodeB, eNB or eNodeB, a vehicle-mounted terminal or some other appropriate terms. For example, in a 5G system, the base station is referred to as a gNB. In order to facilitate the description, in the examples of the disclosure, the apparatuses that provide the wireless communication functions for the terminal device are collectively referred to as the network side devices.

The disclosure relates to the field of communications, in particular to a beam indication method and apparatus.

With the development of new radio (NR) technologies, attenuation of a high-frequency channel is fast, and in order to ensure a network coverage, it needs to use beam-based transmission.

In order to reduce the number of signaling, common beams are used for transmission. However, in the related art, there is more than one common beam group to be transmitted. A terminal device cannot determine that the common beams are used for transmission of which specific common beam group, and the quality of signals transmitted on the basis of the common beams is poor.

A beam indication method, implemented in an apparatus, a terminal device, a network side device, a communication device, and a storage medium, provided by the disclosure are used for solving the problem of poor quality of signals transmitted on the basis of common beams in the related art.

An example of a first aspect of the disclosure provides a beam indication method, performed by a terminal device, and including: receiving first control signaling, where the first control signaling is configured to determine a target common beam, and the target common beam is configured to transmit a member in a first target common beam group; and transmitting at least one member in the first target common beam group by the target common beam.

An example of a second aspect of the disclosure provides another beam indication method, performed by a network side device, and including: sending first control signaling, where the first control signaling is configured to determine a target common beam by a terminal device, and the target common beam is configured to transmit a member in a first target common beam group.

An example of a third aspect of the disclosure provides a beam indication apparatus, performed by a terminal device, and including: a receiving module, configured to receive first control signaling, where the first control signaling is configured to determine a target common beam, and the target common beam is configured to transmit a member in a first target common beam group; and a transmission module, configured to transmit at least one member in the first target common beam group by the target common beam.

An example of a fourth aspect of the disclosure provides another beam indication apparatus, performed by a network side device, and including: a sending module, configured to send first control signaling, where the first control signaling is configured to determine a target common beam by a terminal device, and the target common beam is configured to transmit a member in a first target common beam group.

An example of a fifth aspect of the disclosure provides a terminal device, including the beam indication apparatus described in the example of the third aspect of the disclosure.

An example of a sixth aspect of the disclosure provides a network side device, including the beam indication apparatus described in the example of the fourth aspect of the disclosure.

An example of a seventh aspect of the disclosure provides a communication device, including: at least one processor; and a memory in communication connection with the at least one processor, where the memory stores instructions capable of being executed by the at least one processor, and the instructions, when executed by the at least one processor, enable the at least one processor to execute the beam indication method described in the example of the first aspect of the disclosure, or the beam indication method described in the example of the second aspect of the disclosure.

An example of an eighth aspect of the disclosure provides a computer readable storage medium storing computer instructions, and the computer instructions are used for enabling a computer to execute the beam indication method described in the example of the first aspect of the disclosure, or the beam indication method described in the example of the second aspect of the disclosure.

The examples provided by the disclosure at least have the following technical effects. According to the beam indication method of the examples of the disclosure, the first control signaling is received, where the first control signaling is configured to determine the target common beam, the target common beam is configured to transmit a member in the first target common beam group, and the at least one member in the first target common beam group is transmitted by the target common beam. Thus, the terminal device can determine, according to the first control signaling, the first target common beam group corresponding to the target common beam, where the target common beam is configured to transmit the member in the first target common beam group. Namely, the terminal device can determine, according to the first control signaling, a correlation between the target common beam and the first target common beam group. Thus, facilitating improvement of a quality of signals transmitted on the basis of common beams is accomplished.

FIG. 1 is a schematic flow chart of a beam indication method provided by an example of the disclosure, which is executed by a terminal device. As shown in FIG. 1, the beam indication method includes the following steps S101 and S102.

In S101, a first control signaling is received. The first control signaling is configured to determine a target common beam, and the target common beam is configured to transmit a member in a first target common beam group.

At present, with development of new radio (NR) technologies, attenuation of a high-frequency channel is fast, and in order to ensure a network coverage, it needs to use beam-based transmission. In order to reduce the number of signaling, mostly, common beams are used for transmission. However, in the related art, there is more than one common beam group to be transmitted, a terminal device cannot determine that the common beams are used for transmission of which specific common beam group, and the quality of signals transmitted on the basis of the common beams is poor.

In the example of the disclosure, the terminal device may receive the first control signaling, the first control signaling is configured to determine the target common beam, and the target common beam is configured to transmit the member in the first target common beam group. That is to say, the terminal device may determine, according to the first control signaling, the first target common beam group corresponding to the target common beam, and the target common beam is configured to transmit the member in the first target common beam group. Thus, the terminal device may determine, according to the first control signaling, a correlation between the target common beam and the first target common beam group. Thus, facilitating the improvement of the quality of the signals transmitted on the basis of the common beams is accomplished.

In the example of the disclosure, the terminal device may further determine the first target common beam group, which may include the following two possible implementations, Mode 1 and Mode 2.

In mode 1: the first target common beam group is a common beam group to which a first control resource set (CORESET) belongs, and the first CORESET is configured to transmit a physical downlink control channel (PDCCH) that carries the first control signaling.

Thus, the first control signaling carried by the PDCCH sent by the CORESET in the first target common beam group is merely configured to determine the target common beam corresponding to the first target common beam group.

In the example of the disclosure, a serial numeral of the CORESET corresponding to the PDCCH in the first target common beam group is not 0, or the serial numeral of the CORESET is 0, and an initial beam corresponding to the CORESET is not obtained by using a random access process, or the first control signaling is not decoded successfully within a preset time threshold. Then the terminal device may further receive second control signaling, where the second control signaling includes a CORESET identifier and a common beam corresponding to the CORESET identifier. Further, the common beam corresponding to the CORESET identifier is determined as a common beam corresponding to the first target common beam group. Thus, in the method, the terminal device may further determine, according to the second control signaling, the common beam corresponding to the first target common beam group, and the common beam is configured to transmit the member in the first target common beam group.

It should be noted that in this disclosure, the type of the second control signaling is not limited herein. Optionally, the second control signaling is medium access control control element (MAC CE) signaling. Mode 2: the first control signaling includes indication information configured to determine the first target common beam group, and at this time, the terminal device may determine the first target common beam group according to the indication information.

In the example of the disclosure, determining the first target common beam group according to the indication information may include the following four possible implementations.

In a first possible implementation, the indication information includes a common beam group identifier, and a common beam group corresponding to the common beam group identifier is determined as the first target common beam group.

It may be understood that there is at least one common beam group, and in the example of the disclosure, an identifier may be pre-established for the common beam group and used for distinguishing different common beam groups. Further, the indication information may include a common beam group identifier, and at this time, the terminal device may determine the common beam group corresponding to the common beam group identifier as the first target common beam group.

It should be noted that in this disclosure, the form of the common beam group identifier is not limited herein, such as including but not limited to text, characters, numbers, and the like.

In a second possible implementation, the indication information includes target CORESET identification information, and a common beam group to which a CORESET corresponding to the target CORESET identification information belongs is determined as the first target common beam group.

It may be understood that there is at least one CORESET, and in the example of the disclosure, identification information may be pre-established for the CORESET and used for distinguishing different CORESETs. Further, the indication information may include target CORESET identification information, and at this time, the terminal device may determine the common beam group to which the CORESET corresponding to the target CORESET identification information belongs as the first target common beam group.

It should be noted that in this disclosure, the form of the target CORESET identification information is not limited herein, such as including but not limited to text, characters, numbers, and the like.

In a third possible implementation, the indication information includes a common beam group flag, a first common beam group, or another common beam group different from the first common beam group is determined as the first target common beam group according to a numerical value of the common beam group flag, where the first common beam group is a common beam group to which a first CORESET belongs, and the first CORESET is configured to transmit a PDCCH that carries the first control signaling.

In the example of the disclosure, when the indication information includes the common beam group flag, there are no more than two common beam groups configured for the terminal device at this time, for example, the first common beam group and another common beam group different from the first common beam group may be included. The first common beam group is a common beam group to which a first CORESET belongs, and the first CORESET is configured to transmit a PDCCH that carries the first control signaling.

Further, the first common beam group or another common beam group different from the first common beam group may be determined as the first target common beam group according to the numerical value of the common beam group flag.

For example, the numerical value of the common beam group flag may be 0 or 1. When the numerical value of the common beam group flag is 0, the first common beam group may be determined as the first target common beam group. Alternatively, when the numerical value of the common beam group flag is 1, another common beam group different from the first common beam group may be determined as the first target common beam group.

In a fourth possible implementation, the indication information includes a CORESET Poolindex (also known as CORESET Poolindex) identifier, and a common beam group corresponding to the CORESET Poolindex identifier is determined as the first target common beam group.

It may be understood that there is at least one CORESET Poolindex, and in the example of the disclosure, an identifier may be pre-established for the CORESET Poolindex, and each CORESET Poolindex corresponds to one common beam group, and is used for distinguishing different common beam groups. Further, the indication information may include the CORESET Poolindex identifier, and at this time, the terminal device may determine a common beam group corresponding to the CORESET Poolindex identifier as the first target common beam group.

It needs to be noted that in the example of the disclosure, the form of the CORESET Poolindex identifier is not limited, such as including but not limited to text, characters, numbers, and the like.

It should be noted that in the example of the disclosure, the type of the first control signaling is not limited. Optionally, the first control signaling is downlink control information (DCI).

In the example of the disclosure, the target common beam is configured for at least one of communication transmission of an uplink (UL) and communication transmission of a downlink (DL).

In the example of the disclosure, there is at least one target common beam. When there are a plurality of target common beams, the plurality of target common beams are used for communication transmission of one or more transmission reception points (TRPs) or transmit/receive points (TRPs), one TRP includes one or more panels, and each panel includes one or more antennas sharing a site location. There is a correlation between the CORESET Poolindex and the TRPs or panels, such as one-to-one correspondence, which is not limited here.

Returning to FIG. 1, in S102, at least one member is transmitted by the target common beam.

In some examples, at least one member in the first target common beam group is transmitted by the target common beam.

In the example of the disclosure, the member includes at least one of communication transmission carried by a physical channel or a reference signal.

In some examples, the physical channel includes at least one of the following: a physical downlink control channel (PDCCH), a physical downlink shared channel, a physical uplink control channel (PUCCH), a physical uplink shared channel (PUSCH), a physical random access channel (PRACH), or a physical broadcast channel (PBCH). In some examples, the physical channel includes at least one of various channels of a sidelink.

In some examples, the reference signal includes at least one of the following: a channel state information reference signal (CSI-RS), a sounding reference signal (SRS), a positioning reference signal (PRS), a phase tracking reference signal (PTRS), or a synchronization signal block (SSB). In some examples, the reference signal includes at least one of various reference signals of a sidelink.

Optionally, the CSI-RS includes at least one of the following: a CSI-RS for channel state information measurement, a CSI-RS for beam measurement, or a CSI-RS for pathloss estimation.

Optionally, the SRS includes at least one of the following: an SRS for channel state information measurement based on codebook, an SRS for channel state information measurement based on non-codebook, an SRS for beam measurement, or an SRS for positioning measurement.

According to the beam indication method of the example of the disclosure, the first control signaling is received, where the first control signaling is configured to determine the target common beam, the target common beam is configured to transmit the member in the first target common beam group, and the at least one member in the first target common beam group is transmitted by the target common beam. Thus, the terminal device can determine, according to the first control signaling, the first target common beam group corresponding to the target common beam, where the target common beam is configured to transmit the member in the first target common beam group. Namely, the terminal device can determine, according to the first control signaling, the correlation between the target common beam and the first target common beam group. Therefore, facilitating improvement of a quality of signals transmitted on the basis of common beams is accomplished.

FIG. 2 is a schematic flow chart of another beam indication method provided by an example of the disclosure, which is executed by a terminal device. As shown in FIG. 2, the beam indication method includes the following steps S201-S203.

In S201 configuration signaling is received. The configuration signaling is configured to determine member information of a member in a first target common beam group.

In the example of the disclosure, the terminal device may further determine the member in the first target common beam group, so as to determine a member in the first target common beam group that needs to be transmitted by the target common beam.

In the example of the disclosure, the terminal device may further receive the configuration signaling, and the configuration signaling is configured to determine the member information of the member in the first target common beam group. That is to say, the terminal device may determine, according to the configuration signaling, the member information of the member in the first target common beam group, so as to determine, according to the above member information, the member in the first target common beam group.

As another possible implementation, the terminal may further determine the member in the first target common beam group according to a default rule, such as all communication transmission corresponding to a first TRP or panel being the member in the first target common beam group. The first TRP or panel uses at least one of a TRP identifier, a panel identifier, a corresponding reference signal resource identifier, CORESET Poolindex, and a CORESET identifier corresponding to the first TRP for distinguishing.

It should be noted that the step of receiving the configuration signaling may be before the step of receiving the first control signaling, or after the step of receiving the first control signaling. In the example, the step of receiving the configuration signaling being before the step of receiving the first control signaling is taken as an example.

Optionally, the member information of the member in the first target common beam group includes CORESET identification information, and the CORESET identification information is configured to indicate at least one of the following: a PDCCH being a member in the first target common beam group, where the PDCCH is sent by a CORESET corresponding to the CORESET identification information; a PDSCH being a member in the first target common beam group, where the PDSCH is scheduled by the PDCCH sent by the CORESET corresponding to the CORESET identification information; a PUSCH being a member in the first target common beam group, where the PUSCH is scheduled by the PDCCH sent by the CORESET corresponding to the CORESET identification information; a PUCCH being a member in the first target common beam group, where the PUCCH is scheduled by the PDCCH sent by the CORESET corresponding to the CORESET identification information; or a reference signal being a member in the first target common beam group, where the reference signal is scheduled by the PDCCH sent by the CORESET corresponding to the CORESET identification information.

Optionally, the member information of the member in the first target common beam group includes CORESET PoolIndex identification information, and the CORESET PoolIndex identification information is configured to indicate at least one of the following: a PDCCH being a member in the first target common beam group, where the PDCCH is sent by a CORESET associated with the CORESET PoolIndex identification information; a PDSCH being a member in the first target common beam group, where the PDSCH is scheduled by a PDCCH sent by a CORESET associated with the CORESET PoolIndex identification information; a PUSCH being a member in the first target common beam group, where the PUSCH is scheduled by the PDCCH sent by the CORESET associated with the CORESET PoolIndex identification information; a PUCCH being a member in the first target common beam group, where the PUCCH is scheduled by the PDCCH sent by the CORESET associated with the CORESET PoolIndex identification information; or a reference signal being a member in the first target common beam group, where the reference signal is scheduled by the PDCCH sent by the CORESET associated with the CORESET PoolIndex identification information.

One piece of CORESET PoolIndex identification information may be associated with one or more CORESETs. In other words, the CORESET PoolIndex identification information corresponding to the one or more CORESETs may be the same.

Optionally, the member information of the member in the first target common beam group includes at least one of the following: identification information corresponding to the PDSCH, resource identification information corresponding to the PUCCH, identification information corresponding to the PUSCH, resource identification information corresponding to a PRACH, identification information corresponding to a reference signal resource, and synchronization signal block (SSB) index information of a PBCH. The identification information corresponding to the PDSCH may include a semi-persistent PDSCH identifier, the resource identification information corresponding to the PUCCH may include a resource identity (ID) corresponding to the PUCCH, or the identification information corresponding to the PUSCH may include a configured grant free PUSCH identifier.

It should be noted that in this disclosure, the type of the configuration signaling is not limited herein. For example, the configuration signaling is at least one of radio resource control (RRC) signaling and MAC CEsignaling.

In S202, first control signaling is received. The first control signaling is configured to determine a target common beam, and the target common beam is configured to transmit a member in a first target common beam group.

In the example of the disclosure, step S202 may be implemented in any of various examples of the disclosure, which is not limited and repeated in the example of the disclosure. In S203, at least one member is transmitted by the target common beam.

In the example of the disclosure, step S203 may be implemented in any of various examples of the disclosure, which is not limited and repeated in the example of the disclosure.

According to the beam indication method in the example of the disclosure, the first control signaling is received, where the first control signaling is configured to determine the target common beam, and the target common beam is configured to transmit the member in the first target common beam group; the configuration signaling is received, where the configuration signaling is configured to determine the member information of the member in the first target common beam group; and the at least one member in the first target common beam group is transmitted by the target common beam. Thus, the terminal device may determine, according to the configuration signaling, the member information of the member in the first target common beam group, so as to determine, according to the above member information, the member in the first target common beam group.

FIG. 3 is a schematic flow chart of yet another beam indication method provided by an example of the disclosure, which is executed by a network side device. As shown in FIG. 3, the beam indication method includes the following step S301.

In S301, a first control signaling is sent. The first control signaling is configured to determine a target common beam by a terminal device, and the target common beam is configured to transmit a member in a first target common beam group.

In the example of the disclosure, the network side device may send the first control signaling, the first control signaling is used by the terminal device for determining the target common beam, and the target common beam is configured to transmit the member in the first target common beam group. Thus, the network side device may preset a correlation between the target common beam and the first target common beam group by sending the first control signaling, so that the terminal device may determine, according to the first control signaling, the first target common beam group corresponding to the target common beam, and the target common beam is configured to transmit the member in the first target common beam group. Thus, facilitating the improvement of the quality of signals transmitted on the basis of common beams is accomplished.

Optionally, the first target common beam group is a common beam group to which a first control resource set (CORESET) belongs, and the first CORESET is configured to transmit a physical downlink control channel (PDCCH) that carries the first control signaling.

Thus, the first control signaling carried by the PDCCH sent by the CORESET in the first target common beam group is merely configured for the terminal device to determine the target common beam corresponding to the first target common beam group.

In the example of the disclosure, a serial numeral of the CORESET corresponding to the PDCCH in the first common beam group is not 0, or the serial numeral of the CORESET is 0, and an initial beam corresponding to the CORESET is not obtained by using a random access process, or the first control signaling is not decoded successfully within a preset time threshold, and then the terminal device may further receive second control signaling, where the second control signaling includes a CORESET identifier and a common beam corresponding to the CORESET identifier. Further, the common beam corresponding to the CORESET identifier is determined as a common beam corresponding to the first common beam group. Thus, in the method, the terminal device may further determine, according to the second control signaling, the common beam corresponding to the first target common beam group, and the common beam is configured to transmit the member in the first target common beam group.

It needs to be noted that in this disclosure, the type of the second control signaling is not limited herein. Optionally, the second control signaling is MAC CEsignaling.

Optionally, the first control signaling includes indication information configured for the terminal device to determine the first target common beam group, and the first target common beam group is determined according to the indication information, so that the terminal device may determine, according to the indication information, the first target common beam group.

In the example of the disclosure, the indication information may include the following four possible implementations.

In Mode 1, the indication information includes a common beam group identifier.

In the example of the disclosure, the first target common beam group is a common beam group corresponding to the common beam group identifier.

It may be understood that there is at least one common beam group, and in the example of the disclosure, an identifier may be pre-established for the common beam group and used for distinguishing different common beam groups. Further, the indication information may include the common beam group identifier, so that the terminal device determines a common beam group corresponding to the common beam group identifier as the first target common beam group.

It should be noted that in this disclosure, the form of the common beam group identifier is not limited herein, such as including but not limited to text, characters, numbers, and the like.

In Mode 2, the indication information includes target CORESET identification information.

In the example of the disclosure, the first target common beam group is a common beam group to which a CORESET corresponding to the target CORESET identification information belongs.

It may be understood that there is at least one CORESET, and in the example of the disclosure, identification information may be pre-established for the CORESET and used for distinguishing different CORESETs. Further, the indication information may include the target CORESET identification information, so that the terminal device determines the common beam group to which the CORESET corresponding to the target CORESET identification information belongs as the first target common beam group.

It should be noted that in this disclosure, the form of the target CORESET identification information is not limited herein, such as including but not limited to text, characters, numbers, and the like.

In Mode 3, the indication information includes a common beam group flag.

In the example of the disclosure, the first target common beam group is a first common beam group corresponding to a numerical value of the common beam group flag or another common beam group different from the first common beam group. The first common beam group is a common beam group to which a first CORESET belongs, and the first CORESET is configured to transmit the PDCCH that carries the first control signaling.

In the example of the disclosure, when the indication information includes the common beam group flag, there are no more than two common beam groups configured for the terminal device at this time. For example, the first common beam group and another common beam group different from the first common beam group may be included. The first common beam group is the common beam group to which the first CORESET belongs, and the first CORESET is configured to transmit a PDCCH that carries the first control signaling.

Further, the indication information may include the common beam group flag, so that the terminal device may determine, according to the numerical value of the common beam group flag, the first common beam group or another common beam group different from the first common beam group as the first target common beam group.

For example, the numerical value of the common beam group flag may be 0 or 1. When the numerical value of the common beam group flag is 0, the first target common beam group is the first common beam group. Alternatively, when the numerical value of the common beam group flag is 1, the first target common beam group is another common beam group different from the first common beam group.

In Mode 4, the indication information includes a CORESET Poolindex identifier.

In the example of the disclosure, the first target common beam group is a common beam group corresponding to the CORESET Poolindex (also known as CORESETPoolindex) identifier.

It may be understood that there is at least one CORESET Poolindex, and in the example of the disclosure, an identifier may be pre-established for the CORESET Poolindex, and each CORESET Poolindex corresponds to one common beam group, and is used for distinguishing different common beam groups. Further, the indication information may include the CORESET Poolindex identifier, so that the terminal device may determine the common beam group corresponding to the CORESET Poolindex identifier as the first target common beam group.

It should be noted that in this disclosure, the form of the CORESET Poolindex identifier is not limited herein, such as including but not limited to text, characters, numbers, and the like.

It should be noted that in this disclosure, the type of the first control signaling is not limited herein. Optionally, the first control signaling is downlink control information (DCI).

In the example of the disclosure, the target common beam is configured for at least one of communication transmission of an uplink (UL) and communication transmission of a downlink (DL).

In the example of the disclosure, there is at least one target common beam. When there are a plurality of target common beams, the plurality of target common beams is used for communication transmission of one or more transmission reception points (TRPs) or transmit/receive points (TRPs), one TRP includes one or more panels, and each panel includes one or more antennas sharing a site location. There is a correlation between the CORESET Poolindex and the TRPs or panels, such as one-to-one correspondence, which is not limited here.

According to the beam indication method in the example of the disclosure, the first control signaling is sent. The first control signaling is configured for the terminal device to determine the target common beam, and the target common beam is configured to transmit the member in the first target common beam group. Thus, the network side device may preset the correlation between the target common beam and the first target common beam group by sending the first control signaling, so that the terminal device may determine, according to the first control signaling, the first target common beam group corresponding to the target common beam, and the target common beam is configured to transmit the member in the first target common beam group. Based on this method, facilitating the improvement of the quality of the signals transmitted on the basis of the common beams is accomplished.

FIG. 4 is a schematic flow chart of still another beam indication method provided by an example of the disclosure, which is executed by a network side device. As shown in FIG. 4, the beam indication method includes the following steps S401 and S402.

In S401, configuration signaling is sent. The configuration signaling is used by a terminal device for determining member information of a member in a first target common beam group.

In the example of the disclosure, the network side device may further send the configuration signaling, and the configuration signaling is configured to determine the member information of the member in the first target common beam group. That is to say, the network side device may preset member information of a member in a first common beam group by sending the configuration signaling, so that the terminal device may determine, according to the configuration signaling, the member information of the member in the first target common beam group, so as to determine, according to the above member information, the member in the first target common beam group.

It should be noted that the step of sending the configuration signaling may be before the step of sending the first control signaling, or after the step of sending the first control signaling, and in the example, the step of sending the configuration signaling being before the step of sending the first control signaling is taken as an example.

In the example of the disclosure, the member includes at least one of communication transmission carried by a physical channel or a reference signal.

In some examples, the physical channel includes at least one of the following: a physical downlink control channel (PDCCH), a physical downlink shared channel, a physical uplink control channel (PUCCH), a physical uplink shared channel (PUSCH), a physical random access channel (PRACH), or a physical broadcast channel (PBCH). In some examples, the physical channel includes at least one of various channels of a sidelink.

In some examples, the reference signal includes at least one of the following: a channel state information reference signal (CSI-RS), a sounding reference signal (SRS), a positioning reference signal (PRS), a phase tracking reference signal (PTRS), or a synchronization signal block (SSB). In some examples, the reference signal includes at least one of various reference signals of a sidelink.

Optionally, the CSI-RS includes at least one of the following: a CSI-RS for channel state information measurement, a CSI-RS for beam measurement, or a CSI-RS for pathloss estimation.

Optionally, the SRS includes at least one of the following: an SRS for channel state information measurement based on codebook, an SRS for channel state information measurement based on non-codebook, an SRS for beam measurement, or an SRS for positioning measurement.

Optionally, the member information of the member in the first target common beam group includes CORESET identification information, and the CORESET identification information is configured to indicate at least one of the following: a PDCCH being a member in the first target common beam group, where the PDCCH is sent by a CORESET corresponding to the CORESET identification information; a PDSCH being a member in the first target common beam group, where the PDSCH is scheduled by the PDCCH sent by the CORESET corresponding to the CORESET identification information; a PUSCH being a member in the first target common beam group, where the PUSCH is scheduled by the PDCCH sent by the CORESET corresponding to the CORESET identification information; a PUCCH being a member in the first target common beam group, where the PUCCH is scheduled by the PDCCH sent by the CORESET corresponding to the CORESET identification information; or a reference signal being a member in the first target common beam group, where the reference signal is scheduled by the PDCCH sent by the CORESET corresponding to the CORESET identification information.

Optionally, the member information of the member in the first target common beam group includes CORESET PoolIndex identification information, and the CORESET PoolIndex identification information is configured to indicate at least one of the following: a PDCCH being a member in the first target common beam group, where the PDCCH is sent by a CORESET associated with the CORESET Pool Index identification information; a PDSCH being a member in the first target common beam group, where the PDSCH is scheduled by a PDCCH sent by a CORESET associated with the CORESET PoolIndex identification information; a PUSCH being a member in the first target common beam group, where the PUSCH is scheduled by the PDCCH sent by the CORESET associated with the CORESET PoolIndex identification information; a PUCCH being a member in the first target common beam group, where the PUCCH is scheduled by the PDCCH sent by the CORESET associated with the CORESET PoolIndex identification information; or a reference signal being a member in the first target common beam group, where the reference signal is scheduled by the PDCCH sent by the CORESET associated with the CORESET PoolIndex identification information.

One piece of CORESET PoolIndex identification information may be associated with one or more CORESETs, that is, the CORESET PoolIndex identification information corresponding to the one or more CORESETs may be the same.

Optionally, the member information of the member in the first target common beam group includes at least one of the following: identification information corresponding to the PDSCH, resource identification information corresponding to the PUCCH, identification information corresponding to the PUSCH, resource identification information corresponding to the PRACH, identification information corresponding to the reference signal resource, and synchronization signal block (SSB) index information of the PBCH. The identification information corresponding to the PDSCH may include a semi-persistent PDSCH identifier, the resource identification information corresponding to the PUCCH may include a resource identity (ID) corresponding to the PUCCH, or the identification information corresponding to the PUSCH may include a configured grant free PUSCH identifier.

It should be noted that in this disclosure, the type of the configuration signaling is not limited herein. For example, the configuration signaling is at least one of radio resource control (RRC) signaling and MAC CE signaling.

In returning to FIG. 4, in S402, a first control signaling is sent. The first control signaling is configured for the terminal device to determine the target common beam, and the target common beam is configured to transmit the member in the first target common beam group.

In the example of the disclosure, step S402 may be implemented in any of various examples of the disclosure, which is not limited and repeated in the examples of the disclosure.

According to the beam indication method in the example of the disclosure, the first control signaling is sent, where the first control signaling is configured for the terminal device to determine the target common beam, and the target common beam is configured to transmit the member in the first target common beam group; and the configuration signaling is sent, where the configuration signaling is configured for the terminal device to determine the member information of the member in the first target common beam group. Thus, the network side device may preset the member information of the member in the first target common beam group by sending the configuration signaling, so that the terminal device may determine, according to the configuration signaling, the member information of the member in the first target common beam group, so as to determine, according to the above member information, the member in the first target common beam group.

Corresponding to the beam indication methods provided in the above examples, the disclosure further provides a beam indication apparatus, which is performed by a terminal device. As the beam indication apparatus provided by the example of the disclosure corresponds to the beam indication methods provided in the examples of FIG. 1 and FIG. 2, the implementations of the beam indication methods are also applicable to the beam indication apparatus provided in the example, which will not be described in detail in the example. FIG. 5 is a schematic structural diagram of a beam indication apparatus provided according to the disclosure.

FIG. 5 is a schematic structural diagram of a beam indication apparatus 100 provided by an example of the disclosure. As shown in FIG. 5, the beam indication apparatus 100 includes: a receiving module 110 and a transmission module 120.

The receiving module 110 is configured to receive a first control signaling, where the first control signaling is configured to determine a target common beam, and the target common beam is configured to transmit a member in a first target common beam group.

The transmission module 120 is configured to transmit at least one member in the first target common beam group by the target common beam.

In one example of the disclosure, the first control signaling is downlink control information (DCI).

In one example of the disclosure, the member includes at least one of communication transmission carried by a physical channel or a reference signal.

In one example of the disclosure, the physical channel includes at least one of the following: a physical downlink control channel (PDCCH), a physical downlink shared channel (PDSCH), a physical uplink control channel (PUCCH), a physical uplink shared channel (PUSCH), a physical random access channel (PRACH), or a physical broadcast channel (PBCH).

In one example of the disclosure, the reference signal includes at least one of the following: a channel state information reference signal (CSI-RS), a sounding reference signal (SRS), a positioning reference signal (PRS), a phase tracking reference signal (PTRS), or a synchronization signal block (SSB).

In one example of the disclosure, the CSI-RS includes at least one of the following: a CSI-RS for channel state information measurement, a CSI-RS for beam measurement, or a CSI-RS for pathloss estimation.

In one example of the disclosure, the SRS includes at least one of the following: an SRS for channel state information measurement based on codebook, an SRS for channel state information measurement based on non-codebook, an SRS for beam measurement, or an SRS for positioning measurement.

In one example of the disclosure, the apparatus 100 further includes: a determining module, not shown, configured to determine the first target common beam group. The first target common beam group is a common beam group to which a first control resource set (CORESET) belongs, and the first CORESET is configured to transmit a PDCCH that carries the first control signaling.

In one example of the disclosure, the first control signaling includes indication information configured to determine the first target common beam group; and the apparatus further includes: a determining module, configured to determine the first target common beam group according to the indication information.

In one example of the disclosure, the indication information includes a common beam group identifier, and the determining module is further configured to determine a common beam group corresponding to the common beam group identifier as the first target common beam group; or the indication information includes target CORESET identification information, and the determining module is further configured to determine a common beam group to which a CORESET corresponding to the target CORESET identification information belongs as the first target common beam group; or the indication information includes a common beam group flag, the determining module is further configured to determine, according to a numerical value of the common beam group flag, a first common beam group or another common beam group different from the first common beam group as the first target common beam group, where the first common beam group is a common beam group to which a first CORESET belongs, and the first CORESET is configured to transmit the PDCCH that carries the first control signaling; or the indication information includes a CORESET Poolindex identifier, and the determining module is further configured to determine a common beam group corresponding to the CORESET Poolindex identifier as the first target common beam group.

In one example of the disclosure, the determining module is further configured to determine the member in the first target common beam group.

In one example of the disclosure, the determining module is further configured to determine the member in the first target common beam group according to a default rule. In one example of the disclosure, the receiving module 110 is further configured to receive configuration signaling, and the configuration signaling is configured to determine member information of the member in the first target common beam group.

In one example of the disclosure, the configuration signaling is at least one of radio resource control (RRC) signaling and MAC CE signaling.

In one example of the disclosure, the member information of the member in the first target common beam group includes CORESET identification information, and the CORESET identification information is configured to indicate at least one of the following: a PDCCH being a member in the first target common beam group, where the PDCCH is sent by a CORESET corresponding to the CORESET identification information; a PDSCH being a member in the first target common beam group, where the PDSCH is scheduled by the PDCCH sent by the CORESET corresponding to the CORESET identification information; a PUSCH being a member in the first target common beam group, where the PUSCH is scheduled by the PDCCH sent by the CORESET corresponding to the CORESET identification information; a PUCCH being a member in the first target common beam group, where the PUCCH is scheduled by the PDCCH sent by the CORESET corresponding to the CORESET identification information; or a reference signal being a member in the first target common beam group, where the reference signal is scheduled by the PDCCH sent by the CORESET corresponding to the CORESET identification information.

In one example of the disclosure, the member information of the member in the first target common beam group includes CORESET PoolIndex identification information, and the CORESET PoolIndex identification information is configured to indicate at least one of the following: a PDSCH being a member in the first target common beam group, where the PDSCH is scheduled by a PDCCH sent by a CORESET associated with the CORESET PoolIndex identification information; a PUSCH being a member in the first target common beam group, where the PUSCH is scheduled by the PDCCH sent by the CORESET associated with the CORESET PoolIndex identification information; a PUCCH being a member in the first target common beam group, where the PUCCH is scheduled by the PDCCH sent by the CORESET associated with the CORESET PoolIndex identification information; or a reference signal being a member in the first target common beam group, where the reference signal is scheduled by the PDCCH sent by the CORESET associated with the CORESET PoolIndex identification information.

In one example of the disclosure, the member information of the member in the first target common beam group includes at least one of the following: identification information corresponding to the PDSCH, resource identification information corresponding to the PUCCH, identification information corresponding to the PUSCH, resource identification information corresponding to the PRACH, identification information corresponding to the reference signal resource, or synchronization signal block (SSB) index information of the PBCH.

In the example of the disclosure, the target common beam is configured for at least one of communication transmission of an uplink or communication transmission of a downlink.

According to the beam indication apparatus 100 of the example of the disclosure, the first control signaling is received, where the first control signaling is configured to determine the target common beam, the target common beam is configured to transmit the member in the first target common beam group, and the at least one member in the first target common beam group is transmitted by the target common beam. Thus, the terminal device (i.e., the beam indication apparatus 100) can determine, according to the first control signaling, the first target common beam group corresponding to the target common beam, where the target common beam is configured to transmit the member in the first target common beam group. Namely, the terminal device (i.e., the beam indication apparatus 100) can determine, according to the first control signaling, a correlation between the target common beam and the first target common beam group. Based on this, facilitating improvement of a quality of signals transmitted on the basis of common beams is achieved.

Figure 6:
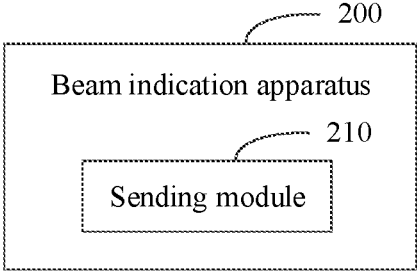
FIG. 6 is a schematic structural diagram of another beam indication apparatus provided by an example of the disclosure.

Corresponding to the beam indication methods provided in the above examples, the disclosure further provides a beam indication apparatus, which is performed by a network side device. As the beam indication apparatus provided by the example of the disclosure corresponds to the beam indication methods provided in the examples of FIG. 3 and FIG. 4, the implementations of the beam indication methods are also applicable to the beam indication apparatus provided in the example, which will not be described in detail in the example. FIG. 6 is a schematic structural diagram of a beam indication apparatus provided according to the disclosure.

FIG. 6 is a schematic structural diagram of a beam indication apparatus 200 provided by an example of the disclosure. As shown in FIG. 6, the beam indication apparatus 200 includes: a sending module 210.

The sending module 210 is configured to send a first control signaling. The first control signaling is configured for a terminal device to determine a target common beam, and the target common beam is configured to transmit a member in a first target common beam group.

In one example of the disclosure, the first control signaling is downlink control information (DCI).

In one example of the disclosure, the member includes at least one of communication transmission carried by a physical channel or a reference signal.

In one example of the disclosure, the physical channel includes at least one of the following: a physical downlink control channel (PDCCH), a physical downlink shared channel (PDSCH), a physical uplink control channel (PUCCH), a physical uplink shared channel (PUSCH), a physical random access channel (PRACH), or a physical broadcast channel (PBCH).

In one example of the disclosure, the reference signal includes at least one of the following: a channel state information reference signal (CSI-RS), a sounding reference signal (SRS), a positioning reference signal (PRS), a phase tracking reference signal (PTRS), or a synchronization signal block (SSB).

In one example of the disclosure, the CSI-RS includes at least one of the following: a CSI-RS for channel state information measurement, a CSI-RS for beam measurement, or a CSI-RS for pathloss estimation.

In one example of the disclosure, the SRS includes at least one of the following: an SRS for channel state information measurement based on codebook, an SRS for channel state information measurement based on non-codebook, an SRS for beam measurement, or an SRS for positioning measurement.

In one example of the disclosure, the first target common beam group is a common beam group to which a first control resource set (CORESET) belongs, and the first CORESET is configured to transmit a PDCCH that carries the first control signaling.

In one example of the disclosure, the first control signaling includes indication information configured for the terminal device to determine the first target common beam group, and the first target common beam group is determined according to the indication information.

In one example of the disclosure, the indication information includes a common beam group identifier, and the first target common beam group is a common beam group corresponding to the common beam group identifier; or the indication information includes target CORESET identification information, and the first target common beam group is a common beam group to which a CORESET corresponding to the target CORESET identification information belongs; or the indication information includes a common beam group flag, and the first target common beam group is a first common beam group corresponding to a numerical value of the common beam group flag or another common beam group different from the first common beam group, where the first common beam group is a common beam group to which a first CORESET belongs, and the first CORESET is configured to transmit a PDCCH that carries the first control signaling.

In one example of the disclosure, the sending module 210 is further configured to send configuration signaling, and the configuration signaling is configured for the terminal device to determine member information of the member in the first target common beam group.

In one example of the disclosure, the configuration signaling is at least one of radio resource control (RRC) signaling and MAC CE signaling.

In one example of the disclosure, the member information of the member in the first target common beam group includes CORESET identification information, and the CORESET identification information is configured to indicate at least one of the following: a PDCCH being a member in the first target common beam group, where the PDCCH is sent by a CORESET corresponding to the CORESET identification information; a PDSCH being a member in the first target common beam group, where the PDSCH is scheduled by the PDCCH sent by the CORESET corresponding to the CORESET identification information; a PUSCH being a member in the first target common beam group, where the PUSCH is scheduled by the PDCCH sent by the CORESET corresponding to the CORESET identification information; a PUCCH being a member in the first target common beam group, where the PUCCH is scheduled by the PDCCH sent by the CORESET corresponding to the CORESET identification information; or a reference signal being a member in the first target common beam group, where the reference signal is scheduled by the PDCCH sent by the CORESET corresponding to the CORESET identification information.

In one example of the disclosure, the member information of the member in the first target common beam group includes CORESET PoolIndex identification information, and the CORESET PoolIndex identification information is configured to indicate at least one of the following: a PDSCH being a member in the first target common beam group, where the PDSCH is scheduled by a PDCCH sent by a CORESET associated with the CORESET PoolIndex identification information; a PUSCH being a member in the first target common beam group, where the PUSCH is scheduled by the PDCCH sent by the CORESET associated with the CORESET PoolindeX identification information; a PUCCH being a member in the first target common beam group, where the PUCCH is scheduled by the PDCCH sent by the CORESET associated with the CORESET PoolindeX identification information; or a reference signal being a member in the first target common beam group, where the reference signal is scheduled by the PDCCH sent by the CORESET associated with the CORESET PoolIndex identification information.

In one example of the disclosure, the member information of the member in the first target common beam group includes at least one of the following: identification information corresponding to the PDSCH, resource identification information corresponding to the PUCCH, identification information corresponding to the PUSCH, resource identification information corresponding to the PRACH, identification information corresponding to the reference signal resource, or synchronization signal block (SSB) index information of the PBCH.

In the example of the disclosure, the target common beam is configured for at least one of communication transmission of an uplink or communication transmission of a downlink.

According to the beam indication apparatus 200 in the example of the disclosure, the first control signaling is sent, where the first control signaling is configured for the terminal device to determine the target common beam, and the target common beam is configured to transmit the member in the first target common beam group. Thus, the network side device (i.e., the beam indication apparatus 200) may preset a correlation between the target common beam and the first target common beam group by sending the first control signaling, so that the terminal device may determine, according to the first control signaling, the first target common beam group corresponding to the target common beam, and the target common beam is configured to transmit the member in the first target common beam group. Thus, facilitating the improvement of the quality of signals transmitted based on common beams is achieved.

According to an example of the disclosure, the disclosure further provides a terminal device, including the beam indication apparatus 100 provided by the example of the disclosure.

According to the terminal device of the example of the disclosure, a first control signaling is received. The first control signaling is configured to determine a target common beam, the target common beam is configured to transmit a member in a first target common beam group, and at least one member in the first target common beam group is transmitted by the target common beam. Thus, the terminal device can determine, according to the first control signaling, the first target common beam group corresponding to the target common beam, where the target common beam is configured to transmit the member in the first target common beam group. Namely, the terminal device can determine, according to the first control signaling, a correlation between the target common beam and the first target common beam group. Therefore, facilitating the improvement of the quality of the signals transmitted on the basis of common beams is achieved.

According to an example of the disclosure, the disclosure further provides a network side device, including the beam indication apparatus 200 provided by the example of the disclosure.

According to the network side device of the example of the disclosure, a first control signaling is sent. The first control signaling is configured for a terminal device to determine a target common beam, and the target common beam is configured to transmit a member in a first target common beam group. Thus, the network side device may preset a correlation between the target common beam and the first target common beam group by sending the first control signaling. Based on this, the terminal device may determine, according to the first control signaling, the first target common beam group corresponding to the target common beam, and the target common beam is configured to transmit the member in the first target common beam group. Thus, facilitating the improvement of the quality of signals transmitted on the basis of common beams is achieved.

According to an example of the disclosure, the disclosure further provides a communication device and a non-transitory computer readable storage medium.

Figure 7:
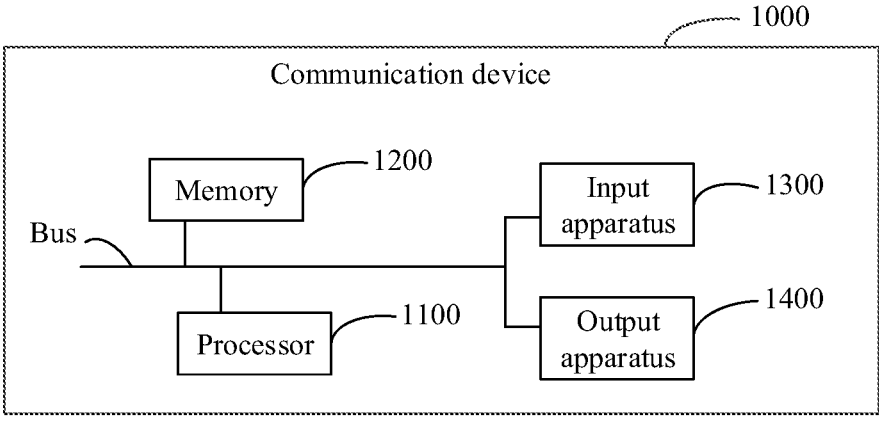
FIG. 7 is a schematic structural diagram of a communication device provided by an example of the disclosure.

As shown in FIG. 7, FIG. 7 is a block diagram of a communication device 1000 according to an example of the disclosure. The communication device 1000 is intended to represent various forms of digital computers, such as a laptop computer, a desktop computer, a workstation, a personal digital assistant, a server, a blade server, a mainframe computer, and other suitable computers. The communication device 1000 may further represent various forms of mobile apparatuses, such as, a personal digital assistant, a cellular phone, a smart phone, a wearable device and other similar computing apparatuses. The components shown here, their connections and relationships, and their functions are merely used as examples, and are not intended to limit the implementations of the disclosure described and/or required here.

As shown in FIG. 7, the communication device 1000 includes: one or more processors 1100, a memory 1200, and interfaces configured to connect all components, including a high-speed interface and a low-speed interface. All the components are connected with one another by using different buses, and may be installed on a common motherboard or in other ways as needed. The processor may process instructions executed in the communication device 1000, including instructions stored in the memory 1200 or on the memory 1200 to display graphical information of a GUI on an external input/output apparatus 1300/1400 (such as a display device coupled to the interfaces). In other implementations, if it is needed, the plurality of processors 1100 and/or a plurality of buses may be used together with a plurality of memories 1200. Similarly, a plurality of communication devices 1000 may be connected, and each device provides part of necessary operations (such as serving as a server array, a set of blade servers, or a multiprocessor system). One processor 1100 is taken as an example in FIG. 7.

The memory 1200 is a non-transitory computer readable storage medium provided by the disclosure. The memory 1200 stores instructions capable of being executed by at least one processor, so that the at least one processor executes the beam indication method provided by the disclosure. The non-transitory computer readable storage medium of the disclosure stores computer instructions, and the computer instructions are used for enabling a computer to execute the beam indication method provided by the disclosure.

The memory 1200, as the non-transitory computer readable storage medium, may be configured to store non-transitory software programs, non-transitory computer executable programs and modules, such as program instructions/modules (such as the receiving module 110 and the transmission module 120 shown in FIG. 5) corresponding to the beam indication method in the example of the disclosure. The processor 1100 executes various functional applications and data processing of a server by running non-transitory software programs, instructions and modules stored in the memory 1200, which implements the beam indication method in the above method examples.

The memory 1200 may include a storage program area and a storage data area, where the storage program area may store an operating system and an application required by at least one function; and the storage data area may store data created according to the use of a positioning communication device and the like. In addition, the memory 1200 may include a high-speed random access memory, and may further include a non-transitory memory, such as at least one disk memory device, a flash memory device, or other non-transitory solid memory devices.

Optionally, the memory 1200 optionally includes a memory remotely set relative to the processor 1100, and these remote memories may be connected to the positioning communication device through a network. Examples of the above network include, but are not limited to an Internet, an enterprise intranet, a local area network, a mobile communication network and their combination.

The communication device 1000 may further include: an input apparatus 1300 and an output apparatus 1400. The processor 1100, the memory 1200, the input apparatus 1300, and the output apparatus 1400 may be connected through at least one bus or other means, and a case of connection through the bus is taken as an example in FIG. 7.

The input apparatus 1300 may receive input digital or character information, and generate key signal inputs related to user setting and function control of the positioning communication device 1000, such as a touch screen, a keypad, a mouse, a trackpad, a touchpad, an indicator bar, one or more mouse buttons, a trackball, a joystick, and other input apparatuses. The output apparatus 1400 may include a display device, an auxiliary lighting apparatus (such as an LED), a tactile feedback apparatus (such as a vibration motor), and the like. The display device may include, but is not limited to a liquid crystal display (LCD), a light emitting diode (LED) display, and a plasma display. In some implementations, the display device may be the touch screen.

Various implementations of the systems and technologies described here may be implemented in a digital electronic circuit system, an integrated circuit system, an application specific integrated circuit (ASIC), computer hardware, firmware, software, and/or their combinations. These various implementations may include: being implemented in one or more computer programs, where the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

These computing programs (also called programs, software, software applications, or codes) include machine instructions of a programmable processor, and may be implemented by using high-level procedures and/or object-oriented programming languages, and/or assembly/machine languages. As used herein, the terms "machine readable medium" and "computer readable medium" refer to any computer program product, device, and/or apparatus (such as a disk, an optical disk, a memory and a programmable logic device (PLD)) configured to provide machine instructions and/or data to the programmable processor, including a machine readable medium that receives the machine instructions as machine readable signals. The term "machine readable signal" refers to any signal used for providing the machine instructions and/or data to the programmable processor.

In order to provide interactions with user(s), the systems and techniques described herein may be implemented on a computer, and the computer has: a display apparatus for displaying information to the user(s) (e.g., a cathode ray tube (CRT) or a liquid crystal display (LCD) monitor); and a keyboard and a pointing device (e.g., a mouse or a trackball), through which the user(s) may provide inputs to the computer. Other types of apparatuses may further be used to provide interactions with users; for example, feedback provided to the user(s) may be any form of sensory feedback (e.g., visual feedback, auditory feedback, or tactile feedback); and an input from the user(s) may be received in any form (including acoustic input, voice input or tactile input).

The systems and techniques described here may be implemented in a computing system including background components (e.g., as a data server), a computing system including middleware components (e.g., an application server), a computing system including front-end components (e.g., a user computer with a graphical user interface or a web browser through which a user may interact with the implementations of the systems and technologies described here), or a computing system including any combination of such background components, middleware components, or front-end components. The components of the system may be interconnected by digital data communication (e.g., a communication network) in any form or medium. Examples of the communication network include: a local area network (LAN), a wide area network (WAN), and the Internet.

A computer system may include a client and a server. The client and the server are generally far away from each other and usually interact through a communication network. The relationship between the client and the server is generated by computer programs running on the corresponding computer and having a client-server relationship with each other.

According to the beam indication method of the examples of the disclosure, the first control signaling is received, where the first control signaling is configured to determine the target common beam, the target common beam is configured to transmit the member in the first target common beam group, and the at least one member in the first target common beam group is transmitted by the target common beam. Thus, the terminal device can determine, according to the first control signaling, the first target common beam group corresponding to the target common beam, where the target common beam is configured to transmit the member in the first target common beam group, namely, the terminal device can determine, according to the first control signaling, the correlation between the target common beam and the first target common beam group, thus facilitating the improvement of the quality of the signals transmitted on the basis of the common beams.

Additional non-limiting embodiments of the disclosure include the following.

1. A beam indication method, performed by a terminal device, and including: receiving first control signaling, where the first control signaling is configured to determine a target common beam, and the target common beam is configured to transmit a member in a first target common beam group; and transmitting at least one member in the first target common beam group by the target common beam.

2. The beam indication method according to embodiment 1, where the first control signaling is downlink control information (DCI).

3. The beam indication method according to embodiment 1 or 2, where the member includes at least one of communication transmission carried by a physical channel or a reference signal.

4. The beam indication method according to embodiment 3, where the physical channel includes at least one of the following: a physical downlink control channel (PDCCH); a physical downlink shared channel (PDSCH); a physical uplink control channel (PUCCH); a physical uplink shared channel (PUSCH); a physical random access channel (PRACH); or a physical broadcast channel (PBCH).

5. The beam indication method according to embodiment 3, where the reference signal includes at least one of the following: a channel state information reference signal (CSI-RS); a sounding reference signal (SRS); a positioning reference signal (PRS); a phase tracking reference signal (PTRS); or a synchronization signal block (SSB).

6. The beam indication method according to embodiment 5, where the CSI-RS includes at least one of the following: a CSI-RS for channel state information measurement; a CSI-RS for beam measurement; or a CSI-RS for pathloss estimation.

7. The beam indication method according to embodiment 5, where the SRS includes at least one of the following: an SRS for channel state information measurement based on codebook; an SRS for channel state information measurement based on non-codebook; an SRS for beam measurement; or an SRS for positioning measurement.

8. The beam indication method according to any one of embodiments 1-7, further including: determining the first target common beam group, where the first target common beam group is a common beam group to which a first control resource set (CORESET) belongs, and the first CORESET is configured to transmit a PDCCH that carries the first control signaling.

9. The beam indication method according to any one of embodiments 1-7, where the first control signaling includes indication information configured to determine the first target common beam group; and the method further includes: determining the first target common beam group according to the indication information.

10. The beam indication method according to embodiment 9, where determining the first target common beam group according to the indication information includes at least one of the following: determining a common beam group corresponding to a common beam group identifier as the first target common beam group, where the indication information includes the common beam group identifier; determining a common beam group to which a CORESET corresponding to target CORESET identification information belongs as the first target common beam group, where the indication information includes the target CORESET identification information; determining a first common beam group or another common beam group different from the first common beam group as the first target common beam group according to a numerical value of a common beam group flag, where the indication information includes the common beam group flag, the first common beam group is a common beam group to which a first CORESET belongs, and the first CORESET is configured to transmit a PDCCH that carries the first control signaling; or determining a common beam group corresponding to a CORESET Poolindex identifier as the first target common beam group, where the indication information includes the CORESET Poolindex identifier.

11. The beam indication method according to any one of embodiments 1-10, further including: determining the member in the first target common beam group.

12. The beam indication method according to embodiment 11, where determining the member in the first target common beam group includes: determining the member in the first target common beam group according to a default rule.

13. The beam indication method according to embodiment 11, where determining the member in the first target common beam group includes: receiving configuration signaling, where the configuration signaling is configured to determine member information of the member in the first target common beam group.

14. The beam indication method according to embodiment 13, where the configuration signaling is at least one of radio resource control (RRC) signaling or MAC CE signaling.

15. The beam indication method according to embodiment 13, where the member information of the member in the first target common beam group includes CORESET identification information, and the CORESET identification information is configured to indicate at least one of the following: a PDCCH being a member in the first target common beam group, where the PDCCH is sent by a CORESET corresponding to the CORESET identification information; a PDSCH being a member in the first target common beam group, where the PDSCH is scheduled by the PDCCH sent by the CORESET corresponding to the CORESET identification information; a PUSCH being a member in the first target common beam group, where the PUSCH is scheduled by the PDCCH sent by the CORESET corresponding to the CORESET identification information; a PUCCH being a member in the first target common beam group, where the PUCCH is scheduled by the PDCCH sent by the CORESET corresponding to the CORESET identification information; or a reference signal being a member in the first target common beam group, where the reference signal is scheduled by the PDCCH sent by the CORESET corresponding to the CORESET identification information.

16. The beam indication method according to embodiment 13, where the member information of the member in the first target common beam group includes CORESET PoolIndex identification information, and the CORESET PoolIndex identification information is configured to indicate at least one of the following: a PDSCH being a member in the first target common beam group, where the PDSCH is scheduled by a PDCCH sent by a CORESET associated with the CORESET PoolIndex identification information; a PUSCH being a member in the first target common beam group, where the PUSCH is scheduled by the PDCCH sent by the CORESET associated with the CORESET Poolindex identification information; a PUCCH being a member in the first target common beam group, where the PUCCH is scheduled by the PDCCH sent by the CORESET associated with the CORESET Poolindex identification information; or a reference signal being a member in the first target common beam group, where the reference signal is scheduled by the PDCCH sent by the CORESET associated with the CORESET Pool Index identification information.

17. The beam indication method according to embodiment 13, where the member information of the member in the first target common beam group includes at least one of the following: identification information corresponding to the PDSCH; resource identification information corresponding to the PUCCH; identification information corresponding to the PUSCH; resource identification information corresponding to the PRACH; identification information of a reference signal resource; or synchronization signal block (SSB) index information of the PBCH.

18. The beam indication method according to any one of embodiments 1-17, where the target common beam is configured for at least one of communication transmission of an uplink or communication transmission of a downlink.

19. A beam indication method, performed by a network side device, and including:

sending first control signaling, where the first control signaling is configured for a terminal device to determine a target common beam, and the target common beam is configured to transmit a member in a first target common beam group.

20. The beam indication method according to embodiment 19, where the first control signaling is downlink control information (DCI).

21. The beam indication method according to embodiment 19 or 20, where the member includes at least one of communication transmission carried by a physical channel or a reference signal.

22. The beam indication method according to embodiment 21, where the physical channel includes at least one of the following: a physical downlink control channel (PDCCH); a physical downlink shared channel (PDSCH); a physical uplink control channel (PUCCH); a physical uplink shared channel (PUSCH); a physical random access channel (PRACH); or a physical broadcast channel (PBCH).

23. The beam indication method according to embodiment 21, where the reference signal includes at least one of the following: a channel state information reference signal (CSI-RS); a sounding reference signal (SRS); a positioning reference signal (PRS); a phase tracking reference signal (PTRS); or a synchronization signal block (SSB).

24. The beam indication method according to embodiment 23, where the CSI-RS includes at least one of the following: a CSI-RS for channel state information measurement; a CSI-RS for beam measurement; or a CSI-RS for pathloss estimation.

25. The beam indication method according to embodiment 23, where the SRS includes at least one of the following: an SRS for channel state information measurement based on codebook; an SRS for channel state information measurement based on non-codebook; an SRS for beam measurement; or an SRS for positioning measurement.

26. The beam indication method according to any one of embodiments 19-25, where the first target common beam group is a common beam group to which a first control resource set (CORESET) belongs, and the first CORESET is configured to transmit a PDCCH that carries the first control signaling.

27. The beam indication method according to any one of embodiments 19-25, where the first control signaling includes indication information configured for the terminal device to determine the first target common beam group, and the first target common beam group is determined according to the indication information.

28. The beam indication method according to embodiment 27, where the indication information includes a common beam group identifier, and the first target common beam group is a common beam group corresponding to the common beam group identifier; or the indication information includes target CORESET identification information, and the first target common beam group is a common beam group to which a CORESET corresponding to the target CORESET identification information belongs; or the indication information includes a common beam group flag, and the first target common beam group is a first common beam group corresponding to a numerical value of the common beam group flag or another common beam group different from the first common beam group, where the first common beam group is a common beam group to which a first CORESET belongs, and the first CORESET is configured to transmit a PDCCH that carries the first control signaling; or the indication information includes a CORESET Poolindex identifier, and the first target common beam group is a common beam group corresponding to the CORESET Poolindex identifier.

29. The beam indication method according to any one of embodiments 16-28, further including: sending configuration signaling, where the configuration signaling is configured for the terminal device to determine member information of the member in the first target common beam group.

30. The beam indication method according to embodiment 29, where the configuration signaling is at least one of radio resource control (RRC) signaling and MAC CE signaling.

31. The beam indication method according to embodiment 29, where the member information of the member in the first target common beam group includes CORESET identification information, and the CORESET identification information is configured to indicate at least one of the following: a PDCCH being a member in the first target common beam group, where the PDCCH is sent by a CORESET corresponding to the CORESET identification information; a PDSCH being a member in the first target common beam group, where the PDSCH is scheduled by the PDCCH sent by the CORESET corresponding to the CORESET identification information; a PUSCH being a member in the first target common beam group, where the PUSCH is scheduled by the PDCCH sent by the CORESET corresponding to the CORESET identification information; a PUCCH being a member in the first target common beam group, where the PUCCH is scheduled by the PDCCH sent by the CORESET corresponding to the CORESET identification information; or a reference signal being a member in the first target common beam group, where the reference signal is scheduled by the PDCCH sent by the CORESET corresponding to the CORESET identification information.

32. The beam indication method according to embodiment 29, where the member information of the member in the first target common beam group includes CORESET PoolIndex identification information, and the CORESET PoolIndex identification information is configured to indicate at least one of the following: a PDSCH being a member in the first target common beam group, where the PDSCH is scheduled by a PDCCH sent by a CORESET associated with the CORESET PoolIndex identification information; a PUSCH being a member in the first target common beam group, where the PUSCH is scheduled by the PDCCH sent by the CORESET associated with the CORESET Poolindex identification information; a PUCCH being a member in the first target common beam group, where the PUCCH is scheduled by the PDCCH sent by the CORESET associated with the CORESET Poolindex identification information; or a reference signal being a member in the first target common beam group, where the reference signal is scheduled by the PDCCH sent by the CORESET associated with the CORESET Pool Index identification information.

33. The beam indication method according to embodiment 29, where the member information of the member in the first target common beam group includes at least one of the following: identification information corresponding to the PDSCH; resource identification information corresponding to the PUCCH; identification information corresponding to the PUSCH; resource identification information corresponding to the PRACH; identification information of a reference signal resource; or synchronization signal block (SSB) index information of the PBCH.

34. The beam indication method according to any one of embodiments 19-33, where the target common beam is configured for at least one of communication transmission of an uplink or communication transmission of a downlink.

35. A beam indication apparatus, performed by a terminal device, and including: a receiving module, configured to receive first control signaling, where the first control signaling is configured to determine a target common beam, and the target common beam is configured to transmit a member in a first target common beam group; and a transmission module, configured to transmit at least one member in the first target common beam group by the target common beam.

36. A beam indication apparatus, performed by a network side device, and including: a sending module, configured to send first control signaling, where the first control signaling is configured to determine a target common beam by a terminal device, and the target common beam is configured to transmit a member in a first target common beam group.

37. A terminal device, including: the beam indication apparatus according to embodiment 35.

38. A network side device, including: the beam indication apparatus according to embodiment 36.

39. A communication device, including: at least one processor; and a memory in communication connection with the at least one processor, where the memory stores instructions capable of being executed by the at least one processor, and the instructions are executed by the at least one processor to enable the at least one processor to execute the beam indication method according to any one of embodiments 1-18, or the beam indication method according to any one of embodiments 19-34.

40. A computer readable storage medium storing computer instructions, where the computer instructions are used for enabling a computer to execute the beam indication method according to any one of embodiments 1-18, or the beam indication method according to any one of embodiments 19-34.

It needs to be understood that various forms of processes shown above may be used to reorder, add, or delete steps. For example, the steps recorded in the disclosure may be executed in parallel, sequentially or in different orders as long as the desired results of the technical solutions applied by the disclosure can be realized, which is not limited here.

What is claimed is:

1. A beam indication method, performed by a terminal device, and comprising:

receiving first control signaling, wherein the first control signaling is configured to determine a target common beam, and the target common beam is configured to transmit a member in a first target common beam group, wherein the first target common beam group corresponds to the target common beam; and transmitting at least one member in the first target common beam group by the target common beam;

wherein the method further comprises:

determining the first target common beam group according to indication information comprised in the first control signaling;

wherein determining the first target common beam group according to the indication information comprised in the first control signaling comprises at least one of the following:

determining a common beam group corresponding to a common beam group identifier as the first target common beam group, wherein the indication information comprises the common beam group identifier;

determining a common beam group to which a control resource set (CORESET) corresponding to target CORESET identification information belongs as the first target common beam group, wherein the indication information comprises the target CORESET identification information;

determining a first common beam group or another common beam group different from the first common beam group as the first target common beam group according to a numerical value of a common beam group flag, wherein the indication information comprises the common beam group flag, the first common beam group is a common beam group to which a first CORESET belongs, and the first CORESET is configured to transmit a physical downlink control channel (PDCCH) that carries the first control signaling; or determining a common beam group corresponding to a CORESET Poolindex identifier as the first target common beam group, wherein the indication information comprises the CORESET Pool index identifier.

2. The beam indication method according to claim 1, wherein the first control signaling is downlink control information (DCI), the member comprises at least one of communication transmission carried by a physical channel or a reference signal, the physical channel comprises at least one of the following:

the PDCCH, a physical downlink shared channel (PDSCH), a physical uplink control channel (PUCCH), a physical uplink shared channel (PUSCH), a physical random access channel (PRACH), or a physical broadcast channel (PBCH), the reference signal comprises at least one of the following:

a channel state information reference signal (CSI-RS);

the CSI-RS comprises at least one of the following:

a CSI-RS for channel state information measurement, a CSI-RS for beam measurement, or a CSI-RS for pathloss estimation, a sounding reference signal (SRS); the SRS comprises at least one of the following:

an SRS for channel state information measurement based on codebook, an SRS for channel state information measurement based on non-codebook, an SRS for beam measurement; or an SRS for positioning measurement, a positioning reference signal (PRS);

a phase tracking reference signal (PTRS); or a synchronization signal block (SSB).

3. The beam indication method according to claim 1, further comprising:

determining the first target common beam group, wherein the first target common beam group is the common beam group to which a first CORESET belongs, and the first CORESET is configured to transmit the PDCCH that carries the first control signaling.

4. The beam indication method according to claim 1, further comprising:

determining the member in the first target common beam group.

5. The beam indication method according to claim 4, wherein determining the member in the first target common beam group comprises:

determining the member in the first target common beam group according to a default rule; or receiving configuration signaling, which is configured to determine member information of the member in the first target common beam group, and wherein the configuration signaling is at least one of radio resource control (RRC) signaling or medium access control control element (MAC CE) signaling.

6. The beam indication method according to claim 5, wherein the member information of the member in the first target common beam group comprises CORESET identification information, and the CORESET identification information is configured to indicate at least one of the following:

a PDCCH being a member in the first target common beam group, wherein the PDCCH is sent by a CORESET corresponding to the CORESET identification information;

a physical downlink shared channel (PDSCH) being a member in the first target common beam group, wherein the PDSCH is scheduled by the PDCCH sent by the CORESET corresponding to the CORESET identification information;

a physical uplink shared channel (PUSCH) being a member in the first target common beam group, wherein the PUSCH is scheduled by the PDCCH sent by the CORESET corresponding to the CORESET identification information;

a physical uplink control channel (PUCCH) being a member in the first target common beam group, wherein the PUCCH is scheduled by the PDCCH sent by the CORESET corresponding to the CORESET identification information; or a reference signal being a member in the first target common beam group, wherein the reference signal is scheduled by the PDCCH sent by the CORESET corresponding to the CORESET identification information.

7. The beam indication method according to claim 5, wherein the member information of the member in the first target common beam group comprises CORESET PoolIndex identification information, and the CORESET PoolIndex identification information is configured to indicate at least one of the following:

a physical downlink shared channel (PDSCH) being a member in the first target common beam group, wherein the PDSCH is scheduled by the PDCCH sent by a CORESET associated with the CORESET PoolIndex identification information;

a physical uplink shared channel (PUSCH) being a member in the first target common beam group, wherein the PUSCH is scheduled by the PDCCH sent by the CORESET associated with the CORESET Poolindex identification information;

a physical uplink control channel (PUCCH) being a member in the first target common beam group, wherein the PUCCH is scheduled by the PDCCH sent by the CORESET associated with the CORESET Poolindex identification information; or a reference signal being a member in the first target common beam group, wherein the reference signal is scheduled by the PDCCH sent by the CORESET associated with the CORESET PoolIndex identification information.

8. The beam indication method according to claim 5, wherein the member information of the member in the first target common beam group comprises at least one of the following:

identification information corresponding to a physical downlink shared channel (PDSCH);

resource identification information corresponding to a physical uplink control channel (PUCCH);

identification information corresponding to a physical uplink shared channel (PUSCH);

resource identification information corresponding to a physical random access channel (PRACH);

identification information of a reference signal resource; or synchronization signal block (SSB) index information of a physical broadcast channel (PBCH).

9. The beam indication method according to claim 1, wherein the target common beam is configured for at least one of communication transmission of an uplink or communication transmission of a downlink.

10. The beam indication method according to claim 1, wherein the method further comprises:

receiving, in a case that the first control signaling fails, a second control signaling; and determining the target common beam according to the second control signaling.

11. The beam indication method according to claim 10, wherein the first control signaling fails in at least one of the following cases:

the first control signaling is not successfully decoded within a preset time threshold;

a serial numeral of the first CORESET corresponding to the PDCCH in the first target common beam group is not 0; or the serial numeral of the first CORESET is 0 and an initial beam corresponding to the first CORESET is not obtained by using a random access process.

12. A beam indication method, performed by a network side device, and comprising:

sending first control signaling, wherein the first control signaling is configured for a terminal device to determine a target common beam, and the target common beam is configured to transmit a member in a first target common beam group, wherein the first target common beam group corresponds to the target common beam;

wherein the first control signaling comprises indication information configured for the terminal device to determine the first target common beam group, and the first target common beam group is determined according to the indication information;

wherein the indication information comprises at least one of:

a common beam group identifier, and the first target common beam group is a common beam group corresponding to the common beam group identifier;

target CORESET identification information, and the first target common beam group is a common beam group to which a CORESET corresponding to the target CORESET identification information belongs;

a common beam group flag, and the first target common beam group is a first common beam group corresponding to a numerical value of the common beam group flag or another common beam group different from the first common beam group, wherein the first common beam group is a common beam group to which the first CORESET belongs, and the first CORESET is configured to transmit a physical downlink control channel (PDCCH) that carries the first control signaling; or a CORESET Poolindex identifier, and the first target common beam group is a common beam group corresponding to the CORESET Poolindex identifier.

13. The beam indication method according to claim 12, wherein the first control signaling is downlink control information (DCI), the member comprises at least one of communication transmission carried by a physical channel or a reference signal, the physical channel comprises at least one of the following:

the PDCCH, a physical downlink shared channel (PDSCH), a physical uplink control channel (PUCCH), a physical uplink shared channel (PUSCH), a physical random access channel (PRACH), or a physical broadcast channel (PBCH), and the reference signal comprises at least one of the following:

a channel state information reference signal (CSI-RS);

the CSI-RS comprises at least one of the following:

a CSI-RS for channel state information measurement, a CSI-RS for beam measurement, or a CSI-RS for pathloss estimation, a sounding reference signal (SRS); the SRS comprises at least one of the following:

an SRS for channel state information measurement based on codebook, an SRS for channel state information measurement based on non-codebook, an SRS for beam measurement; or an SRS for positioning measurement, a positioning reference signal (PRS);

a phase tracking reference signal (PTRS); or a synchronization signal block (SSB).

14. The beam indication method according to claim 12, wherein the first target common beam group is the common beam group to which a first CORESET belongs, and the first CORESET is configured to transmit the PDCCH that carries the first control signaling.

15. The beam indication method according to claim 12, further comprising:

sending configuration signaling, which is configured for the terminal device to determine member information of the member in the first target common beam group, and wherein the configuration signaling is at least one of radio resource control (RRC) signaling and medium access control control element (MAC CE) signaling.

16. The beam indication method according to claim 15, wherein the member information of the member in the first target common beam group comprises CORESET identification information, and the CORESET identification information is configured to indicate at least one of the following:

a PDCCH channel being a member in the first target common beam group, wherein the PDCCH is sent by a CORESET corresponding to the CORESET identification information;

a physical downlink shared channel (PDSCH) being a member in the first target common beam group, wherein the PDSCH is scheduled by the PDCCH sent by the CORESET corresponding to the CORESET identification information;

a physical uplink shared channel (PUSCH) being a member in the first target common beam group, wherein the PUSCH is scheduled by the PDCCH sent by the CORESET corresponding to the CORESET identification information;

a physical uplink control channel (PUCCH) being a member in the first target common beam group, wherein the PUCCH is scheduled by the PDCCH sent by the CORESET corresponding to the CORESET identification information; or a reference signal being a member in the first target common beam group, wherein the reference signal is scheduled by the PDCCH sent by the CORESET corresponding to the CORESET identification information.

17. The beam indication method according to claim 15, wherein the member information of the member in the first target common beam group comprises CORESET PoolIndex identification information, and the CORESET PoolIndex identification information is configured to indicate at least one of the following:

a physical downlink shared channel (PDSCH) being a member in the first target common beam group, wherein the PDSCH is scheduled by the PDCCH sent by a CORESET associated with the CORESET PoolIndex identification information;

a physical uplink shared channel (PUSCH) being a member in the first target common beam group, wherein the PUSCH is scheduled by the PDCCH sent by the CORESET associated with the CORESET Poolindex identification information;

a physical uplink control channel (PUCCH) being a member in the first target common beam group, wherein the PUCCH is scheduled by the PDCCH sent by the CORESET associated with the CORESET Poolindex identification information; or a reference signal being a member in the first target common beam group, wherein the reference signal is scheduled by the PDCCH sent by the CORESET associated with the CORESET PoolIndex identification information.

18. The beam indication method according to claim 15, wherein the member information of the member in the first target common beam group comprises at least one of the following:

identification information corresponding to a physical downlink shared channel (PDSCH);

resource identification information corresponding to a physical uplink control channel (PUCCH);

identification information corresponding to a physical uplink shared channel (PUSCH);

resource identification information corresponding to a physical random access channel (PRACH);

identification information of a reference signal resource; or synchronization signal block (SSB) index information of a physical broadcast channel (PBCH).

19. The beam indication method according to claim 12, wherein the target common beam is configured for at least one of communication transmission of an uplink or communication transmission of a downlink.

20. The beam indication method according to claim 12, wherein the method further comprises:

sending, in a case that the first control signaling fails, a second control signaling, wherein the second control signaling is configured for the terminal device to determine the target common beam.

* * * * *